United States Patent [19]

Flick

[11] Patent Number: 5,069,375

[45] Date of Patent: Dec. 3, 1991

[54] VEHICLE FAST FOOD TRAY

[76] Inventor: Sandra Flick, 8044 HCR 82/19707 Mtn. Meadow S., Middletown, Calif. 95461

[21] Appl. No.: 526,891

[22] Filed: May 22, 1990

[51] Int. Cl.$^5$ .............................................. B60R 7/00
[52] U.S. Cl. .................................. 224/273; 224/275; 108/43; 108/44
[58] Field of Search .................. 224/273, 275; 108/43, 108/44; 206/549, 542, 564; 280/801; 229/904

[56] References Cited

U.S. PATENT DOCUMENTS

| 126,213   | 4/1872 | Ireland et al. | 108/43  |
|-----------|--------|----------------|---------|
| 2,897,974 | 8/1959 | Cook           | 224/273 |
| 3,361,091 | 1/1968 | Inman          | 108/43  |
| 4,610,463 | 9/1986 | Efrom          | 280/801 |
| 4,765,583 | 8/1988 | Tenner         | 108/43  |
| 4,949,890 | 8/1990 | Schultz        | 224/275 |

Primary Examiner—Linda J. Sholl
Attorney, Agent, or Firm—Robert Strauss

[57] ABSTRACT

There is disclosed a food support tray that is intended to be secured while resting on the lap of an occupant of a motor vehicle. The tray has a fastener which detachably secures it on the lap of the occupant. Preferably, the fastener is a clip which secures the tray to the seat belt of the vehicle when the seat belt is fastened about the occupant. The tray is generally planar with longitudinal forward and rear edges and opposite and shorter end edges. The rear edge is arcuately bowed inwardly, contouring to the waist of the occupant. The forward edge can also be bowed inwardly at a central location to provide clearance for the steering wheel, thus permitting its use by the driver of a vehicle. The tray has vertically walled recesses on its upper surface, preferably at least one is provided for reception of a beverage cup.

9 Claims, 2 Drawing Sheets

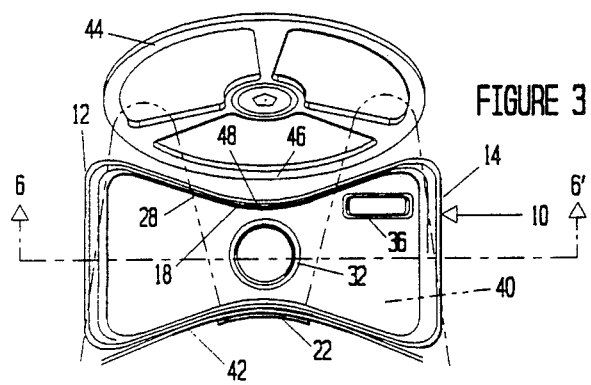
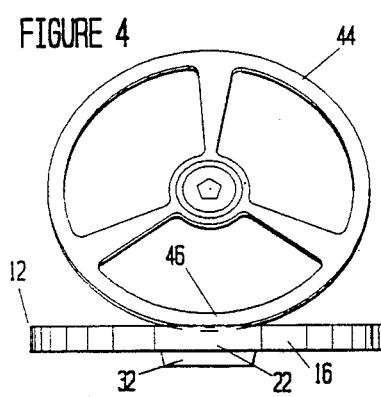
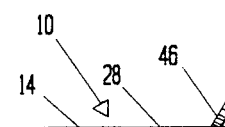
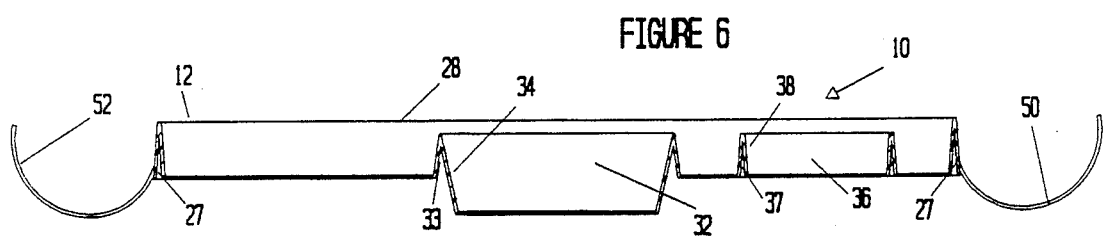

VEHICLE FAST FOOD TRAY

BACKGROUND OF THE INVENTION

1. Field of Invention

This invention relates to a food tray and, in particular, to a food tray intended for use by an occupant, i.e., a driver and/or passenger in a motor vehicle

2. Brief Statement of the Prior Art

The high popularity of fast food outlets has encouraged the practice of eating in motor vehicles Most vehicles are not designed or intended for this application, however, some vehicles now provide beverage cup receptacles molded into dash boards, arm rests and side panels The locations of these recesses are often inconvenient for the occupants, e.g., are out of the occupants' reach when the seat belts are fastened When the driver uses these receptacles, the driver's attention is distracted by the requirement to reach for remotely located beverage cups.

Examples of prior attempts to provide rests or trays for food items are the subjects of U.S. Pat. Nos. 2,299,025 and 4,805,867 (trays which attaches to the steering wheel); 4,770,107 (portable tray for rear seat occupants); 1,569,157 (beverage device with contoured rear edge); and 3,804,031 (tray with beverage cup holders) None of the prior attempts has provided a tray which can be rested on the occupants' laps and secured with belts to permit the vehicle to be operated while using the tray.

The failure to provide a convenient support or storage of food and beverage items in a motor vehicle represents an inconvenience to the occupants and becomes a road hazard when the driver is preoccupied by balancing or juggling foods and beverage cups and attempting to drive the vehicle. The inconvenient locations of the storage recesses provided in vehicles encourages a disregard for seat belts which must often be released to permit the occupant to reach the food item Thus, there is a need for a food support tray which can be firmly secured in the lap of an occupant which encourages or requires the occupant to use the seat belt.

BRIEF STATEMENT OF THE INVENTION

This invention comprises a food support tray that is intended to be secured while resting on the lap of an occupant of a motor vehicle. The tray is generally planar with longitudinal forward and rear edges and opposite and shorter end edges. The rear edge is arcuately bowed inwardly, contouring to the waist of the occupant while the forward edge is also bowed inwardly at a central location to provide clearance for the steering wheel, thus permitting its use by the driver of a vehicle. The tray has vertically walled recesses on its upper surface, preferably at least one is provided for reception of a beverage cup and has a fastener which detachably secures it on the lap of the occupant. Preferably, the fastener is a clip which secures the tray to the seat belt of the vehicle when the seat belt is fastened about the occupant.

OBJECTIVES OF THE INVENTION

It is an object of this invention to provide a food tray for occupants of a motor vehicle.

It is a further object of this invention to provide a food tray which can be fastened securely in the lap of an occupant of a motor vehicle.

It is an additional object of this invention to provide a food tray which encourages or requires that the seat belt of a motor vehicle be fastened about the occupant.

It is also an object of this invention to provide a food tray which can rest securely on the lap of a driver of a motor vehicle without impairing the driver's ability to control the vehicle.

Other and related objects will be apparent from the following description of the invention.

BRIEF DESCRIPTION OF THE DRAWINGS

The invention will be described with reference to the Figures of which:

FIG. 3 is a plan view of the tray on the lap of a driver;

FIG. 4 is a front elevational view of the tray on the lap of a driver;

FIG. 5 is a side elevational view of the tray on the lap of a driver; and

FIG. 6 is a elevational sectional view along line 6—6' of FIG. 3.

DESCRIPTION OF PREFERRED EMBODIMENTS

Figure 1:
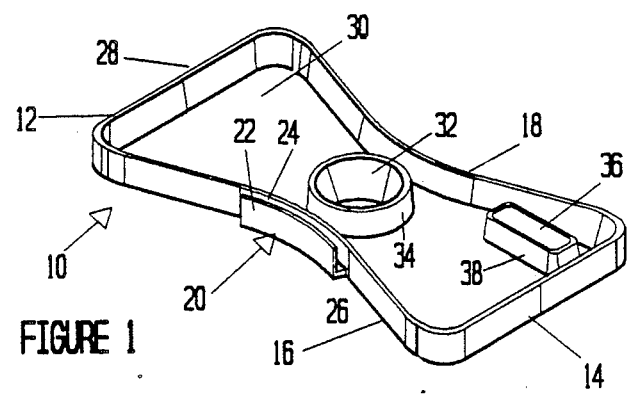
FIG. 1 is a perspective view of the tray of the invention.

FIG. 1 illustrates the tray 10 of the invention as being generally flat and planar with opposite end edges 12 and 14 that are preferably parallel, and with longitudinal side edges 16 and 18 which are bowed inwardly, approximately at their midpoints. The rear longitudinal side edge 16 is provided with attachment means 20 for securing the tray to the seat belt of a vehicle when the belt is fastened in a restraining position across the waist of a user. For this purpose, a clip 22 is provided on the rear longitudinal side edge 16 of the tray. The clip 22 preferably is open along its upper edge 24, thereby forming a bowed slot 26 which can receive the seat belt of the vehicle. The clip 22 can be integrally formed with the tray 10.

Preferably, the clip has an outwardly flared mouth or entrance on its open edge to provide a slot between the side edge of the tray and the inside surface of the clip which will removably receive a seat belt.

The upper surface of the tray is preferably provided with a peripheral rim 28 that is raised above the upper surface 30 of the tray. The rim 28 is coextensive with the longitudinal front and rear edges 16 and 18, and end edges 12 and 14 of the tray, thereby forming a fence about the tray. The height of the rim 28 can be varied substantially as desired for the particular application. When the tray is used to support other trays, this rim can be a quite shallow, approximately 0.1 to about 0.25 inch. When the tray is intended for loose food items, the rim should function as a containment fence, and it can be of substantially greater height, e.g., from about 0.25 to about 1.0 inch.

Preferably at least one well 32 is provided in the upper surface 30 of the tray 10. The well 32 is formed with a wall 34 entirely surrounding the well. This well 32 is preferably circular, thereby serving as a beverage cup holder and, for this purpose, the surrounding wall 34 about the recess should be approximately 0.5 to about 1.0 inch in height. Preferably the cylindrical beverage cup recess is centrally located on the tray as this location as in this location it is less susceptible to tilting or movement that could spill the contents of the beverage cup. As shown in FIGS. 4 and 5, the well 32 can project beneath the undersurface of tray 10, thereby providing an adequate height to the wall 34 for containment of beverage cups, while still maintaining a suitable shallow configuration for the tray 10 and rim 28.

There can also, optionally, be provided other wells with surrounding walls such as the generally rectangular well 36 located at one corner of the tray 10. This well is also formed by a surrounding wall 38 which is about 0.5 to about 1.0 inch in height. The rectangular well 36 is very useful for containment of items such as packages of french fries, tacos and the like.

Figure 2:
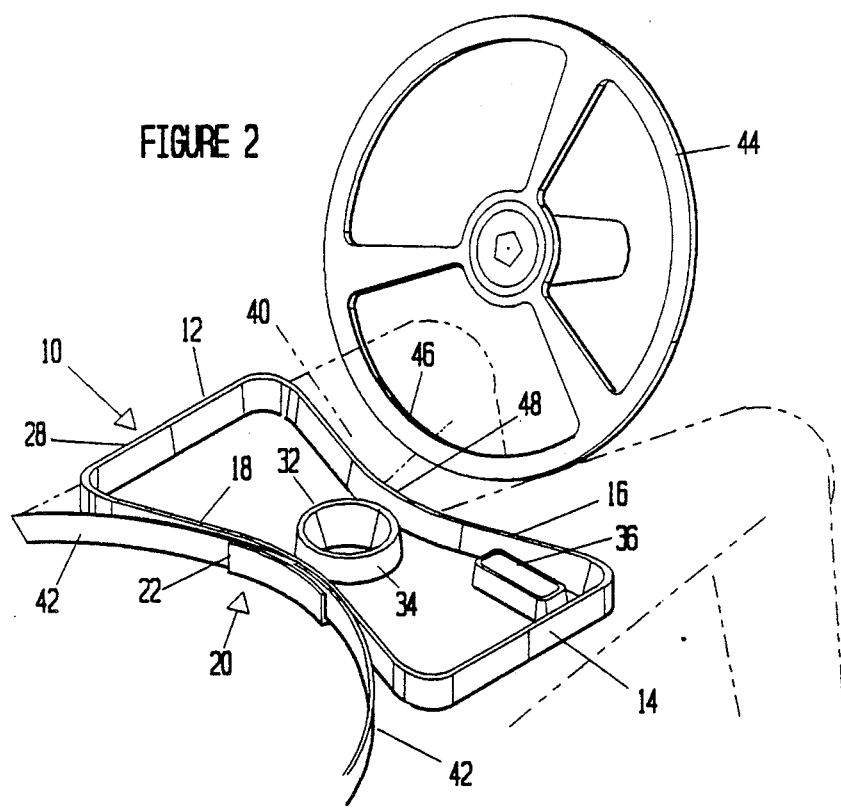
FIG. 2 is a perspective view of the tray of the invention on the lap of a driver of a vehicle.

Referring now to FIGS. 2 through 5, there is illustrated the tray of the invention on the lap of a driver. In FIG. 2, the driver is shown in phantom lines. In this application, the tray 10 rests on the lap 40 of the driver and the concave-bowed rear edge 16 has a contour to conform to the waist of the driver so that the tray fits about the waist of the user. In this position, the attachment clip 22 readily receives the seat belt 42 which is fastened about the driver's waist.

The concave-bowed forward longitudinal edge 18 of the tray 10 also provides clearance for the steering wheel 44 of the vehicle. The lowermost edge 46 of the steering wheel is received within the bight 48 of the concave bow of the forward edge 18, thereby ensuring that the tray does not interfere with the free rotational movement of the steering wheel 44. The relative positions of the steering wheel 44 and the tray 10 are more apparent in FIGS. 3 through 5, which illustrate these elements. FIG. 3 is a plan view looking down on the tray from the roof of the vehicle, and it can be seen that the steering wheel 44 extends substantially into the bight 48 of the bowed forward edge 18 of tray 10. This is also apparent from the front elevational view shown in FIG. 4 and the side elevational view shown in FIG. 5, where the lowermost edge 46 of the steering wheel is shown within the bight 48 of the tray 10. Alternatively, the tray can have a straight front edge, provided that the edge does not extend beyond position which the bight occupies in the illustration.

Preferably the tray is configured to permit nesting of the trays in orderly stacks. For this purpose, the tray has an undersurface which closely conforms to the contour of its upper surface. FIG. 6 illustrates this configuration, with the tray 10 being formed with rim 28 having tapered sides and a coextensive peripheral groove 27 on its undersurface, which receives the rim 28 of a subjacent tray when nested in a stacked array. The wall 34 of the well 32 is also tapered and has an annular groove 33 on its undersurface to receive the wall 34 of the well 32 of a subjacent tray. Similarly, the well 36 is formed with a tapered wall 38 and a surrounding groove 37 on its undersurface.

The tray of the invention can be formed of any suitable sheet metal for permanent and repeated use. It can also be disposable and formed of plastics, e.g., polystyrene foam, polyethylene, polypropylene, polyvinyl chloride, etc. When it is intended for disposable use, a preferred material is biodegradable paperboard or pulp, however, it could also be formed of recycled plastics, or of biodegradable plastics.

In the illustrated application, the tray can be seen to be readily accessible to the occupant, either a passenger or the driver of a motor vehicle without the necessity for diverting attention from driving tasks. One using the tray is not impeded in the free use of one's hands, as the food items can quickly be returned to the tray. The driver hands are thus free for normal driving functions, and the food items can be readily stored on the tray and retrieved without the necessity of diverting the driver's observation from the road and other vehicles.

The preferred embodiment of the tray, as illustrated, has a seat belt clip which can only attach to a seat belt when the belt is in its fastened, passenger-restraining position. Accordingly, the tray serves to encourage proper use of seat belts.

As there are some applications which employ only shoulder belts or other seat belts not adaptable to a tray, the invention can also be provided with fabric or plastic straps 50 and 52 which are secured at opposite ends 12 and 14 of the tray 10, and which can be wrapped about the legs of the user, with the ends of the straps resting beneath the user's legs. For this purpose, the straps 50 and 52 should be a suitable length, e.g., from 12 to about 16 inches.

The tray of the invention serves to support fast food items and condiments at readily accessible locations to a user occupant of a motor vehicle. Since the preferred embodiment of the tray has attachment means which require the cooperative fastening of the vehicle's seat belts, the tray promotes passenger safety and protection. This is in sharp contrast to conventional practice in which paper or cardboard trays or supports are loosely stored in or about a vehicle at any convenient location, often requiring that the occupant unfasten the seat belt in order to reach the items stored on these trays. Also, the tray secures the food items and prevents them from spilling or tumbling with abrupt movements of the motor vehicle.

The tray is suitable for use by a driver of a motor vehicle as it stores the food items on the lap of the driver, out of any obstructing location to the driver's freedom of movement to control the vehicle and in a location where they will not distract the driver from the driving tasks.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A food tray adapted to be securely supported on the lap of a person setting in a motor vehicle which includes seat belt restraints that in their restraint positions, extend across the waist of said person, which tray comprises:
   a. a generally planar support tray having a generally rectangular exterior shape with a longitudinal axis and a transverse axis and being symmetrical about its transverse axis with forward and rear longitudinal edges and opposite end edges of lesser length than said forward and rear edges, and with at least one permanent receptacle on its upper surface for retaining a food item;
   b. a first inwardly directed and centrally located bow in said rear edge which has sufficient dimensions and is located to fit in close conformity to the waist of said person, thereby providing substantially equally shaped portions extending symmetrically to either side of said person; and
   c. a seat belt engaging clip of arcuate shape and symmetrically carried on said centrally located bow in the rear edge of said tray to secure said tray to said seat belt.

2. The food tray of claim 1 wherein said seal belt restraints include a belt which extends across the person's waist and said seat belt engaging clip comprises a slot carried on the rear edge of said tray for removably receiving said seat belt.

3. The food tray of claim 1 wherein said tray has a second, inwardly directed and centrally located bow in said forward edge which has sufficient dimensions and is located to provide clearance for the steering wheel of said vehicle.

4. The food tray of claim 3 wherein said tray has an external shape which is also symmetrical about its longitudinal axis.

5. The food tray of claim 1 wherein said receptacle is a cylindrically walled recess on the upper surface of the tray to receive a liquid beverage cup.

6. The food tray of claim 1 including a raised, rim extending coextensively about said rear, forward and opposite end edges of said tray.

7. The food tray of claim 6 including at least one cylindrically walled recess on the upper surface of the tray to receive a liquid beverage cup.

8. The food tray of claim 5 including at least one additional receptacle on the upper surface of the tray to receive a food item.

9. The food tray of claim 1 formed of molded plastic.

* * * * *